March 17, 1925.  
W. H. ROUSSEL  
1,530,415  
EGG PROCESSING APPARATUS  
Filed May 24, 1923
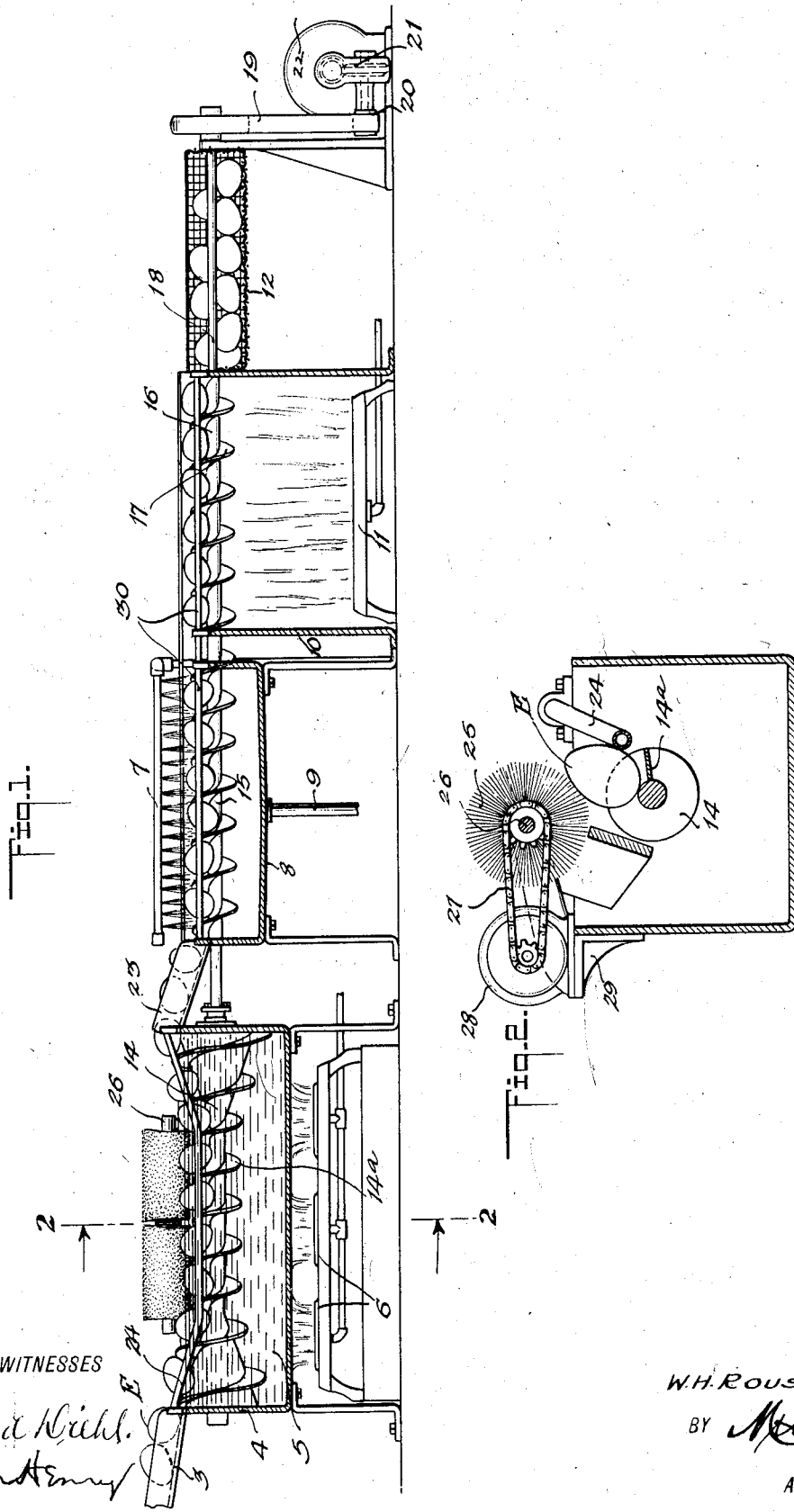
INVENTOR  
W.H. ROUSSEL Patented Mar. 17, 1925.

1,530,415

UNITED STATES PATENT OFFICE.

WILLIAM H. ROUSSEL, OF SAN FRANCISCO, CALIFORNIA.

EGG-PROCESSING APPARATUS.

Application filed May 24, 1923. Serial No. 641,175.

*To all whom it may concern:*

Be it known that I, WILLIAM H. ROUSSEL, a citizen of the United States, and a resident of San Francisco, in the county of San Francisco and State of California, have invented certain new and useful Improvements in Egg-Processing Apparatus, of which the following is a full, clear, and exact description.

This invention relates to egg processing and aims to provide a new and improved apparatus adapted particularly for use to facilitate a carrying out of the processing.

The present invention also provides a new and improved egg processing apparatus comprising essentially, but in addition to various auxiliary devices preferred to be incorporated as hereinafter explained, the combination with a tank containing a body of processing liquid, of means for transporting eggs relative to said liquid, to at least partially submerge an egg therein and then automatically to lift such egg above the liquid, and, preferably, a means also for tumbling an egg during such period of its submergence, while preferably maintaining the egg always above the axis of the spiral conveyor preferably constituting the main member of such means. In this connection, the tumbling means includes preferably not only a guiding and confining means adjacent the conveyor for maintaining an egg always above the axis of rotation of the conveyor, but a rotatable brush for scrubbing an egg during transport of the egg by the conveyor.

A further object of the invention is to provide an apparatus of the class above characterized, thus to facilitate a carrying out of the processing, but an apparatus wherein there is provided a conveyor means for the eggs including a plurality of spaced spiral conveyors, and dissimilar egg-treating instrumentalities one adjacent each conveyor. In this connection, preferably, a gravity chute is incorporated constituting an automatic means for transferring an egg from one conveyor to another, yet with the preferable construction embodied of mounting both the conveyors last mentioned on a single shaft to be rotated, as from an electric motor or other suitable power source. The end last mentioned is preferably attained by making cone-shaped one end of the first of said two conveyors in the line of egg transport, and having such cone of gradually increasing diameter toward an end of said first conveyor and toward the upper end of the gravity chute.

As will be more clearly understood hereinafter, the aforesaid dissimilar egg-treating instrumentalities are for the purpose of facilitating a carrying out of the present invention, to wit, a sequence of steps such that an egg is first submerged in a heated solution of lye, preferably while being tumbled and scrubbed or brushed, is then sprayed or otherwise washed, as with clean water, while being further transported, and is then heated to remove all or a part of said washing fluid, during further transport.

The various features of the invention and the advantages inherent, as also various objects sought to be attained other than those indicated above, will be in part specifically pointed out and in part indicated hereinafter.

The invention will thus be best understood from a consideration of the following detailed description when taken in connection with the accompanying drawings forming part of this specification; with the understanding, however, that such drawing illustrates, merely by way of example, some possible embodiments of the invention, and that the invention is not confined to any strict conformity with the showing in the drawing, but may be changed and modified so long as such changes and modifications mark no material departure from the salient features of the invention as expressed in the appended claims.

In said drawing,

Fig. 1 is a side elevation, partially in section, showing an embodiment of the preferred apparatus and also illustrating a process; and Fig. 2 is a transverse section taken on the line 2—2 of Fig. 1.

Referring now to the details of the drawing, at 3 is indicated a receiving gravity chute for the eggs E.

A plurality of egg-treating instrumentalities are provided in line, of which the first is a tank 4 containing a body of liquid 5, preferably a solution of lye, heated by a set of gas-burners 6 or the like; the second is an overhead water spray pipe 7 overlying a water-collecting tank 8 provided with a drain-pipe 9; the third of which is a well 10 having a gas-heater 11 or the like near its bottom; and the fourth of which is a foraminous or similar shelf or collection basket 12 for eggs which have been conveyed past and treated by the instrumentalities in the line ahead of member 12 as just described.

The conveyor means for advancing an egg E at the lower end of chute 3, as a part of a substantially horizontal column of eggs, to the egg basket or collector 12, is of the spiral conveyor type, and includes a plurality of spaced individual spiral conveyors 14 and 15—16. By virtue of the provision of means to be described in a moment, each of such two conveyors (there being only two in the present case, since the conveyor portions 15—16 are parts of a single conveyor member having a spiral rib 17 extending continuously from the extreme left end of conveyor portion 15 to the extreme right end of conveyor portion 16), is in mutual axial prolongation of the other, and, being fixed on a common shaft 18 extending lengthwise from one end of the apparatus to the other, the entire conveyor means of such apparatus is adapted to be continuously rotated by means of a single belt 19 driven from a small pulley 20 forming a part of a worm-type speed reduction gearing as indicated at 21 and taking its power input from an electric motor 22.

The means referred to near the beginning of the last preceding sentence involves a shaping of the right-hand end of conveyor 14, both as to the central core portion and as to the continuous conveyor rib, such that, as illustrated, that end of the conveyor 14 is cone-shaped. As the result of such construction, and the presence of a gravity chute 23 between tank 4 and tank 8 as shown, continuous rotation of shaft 18 not only elevates an egg already at least partially submerged in liquid 5, above such liquid, but delivers said egg at the upper end of chute 22, for passage on toward pickup by portion 15 of conveyor 15—16. And by a similar construction of conveyor 14 at the left-hand end of tank 4, on each revolution of shaft 18, the lowermost egg in the column supported by chute 3 is picked up by conveyor 14, ready for transport by such conveyor toward at least partial submergence in liquid 5 and thereupon for travel through the liquid while so submerged and until arriving within the field of operation of the cone-shaped end of conveyor 14 adjacent chute 23.

In order to provide, in connection with conveyor 14, a guiding means for permitting the continuous spiral rib 14ª of that conveyor to co-act with the hub portion of the conveyor to transport an egg lengthwise of the conveyor and yet maintain said egg always above the axis of rotation of the conveying means, a guiding and conveying means is provided in the shape, in the present instance, of a fixed confiner 24. Such confiner is bent at a plurality of points along its length, as shown best in Fig. 1, to hold an egg as described relative to conveyor 14 not only in regard to the central cylindrical portion of the hub of the conveyor, but also in regard to the terminal cone-shaped portions thereof; and said confiner may be conveniently a rod, or a tube as indicated in Fig. 2.

The guiding and confining means as above described, and with member 14 properly shaped and disposed, will in most cases be sufficient, especially if the conveyor means rotates in a clockwise direction as viewed in Fig. 2. But since according to the preferred mode of practicing the invention, it is desirable to incorporate means for tumbling and simultaneously brushing or scrubbing an egg as the same is transported lengthwise of tank 4, the following parts are provided to do the major work of such tumbling and scrubbing and also to co-act with member 14 thereby to form a part also of the guiding and confining means: This tumbling and brushing means includes a pair of cylindrical brushes 25 fixed on a common shaft 26, driven, as shown in Fig. 2, by a sprocket chain 27 from an electric motor 28 set on a shelf 29.

Operation of the apparatus.

The operation of the conveyor means, so far as the conveyor 14 is concerned, and hence of the guiding, confining, tumbling and brushing means associated with said conveyor 14, should be clear from the foregoing. And the subsequent operation of conveyor 15—16, relative to eggs passing on beyond conveyor 14 and into chute 23, should be equally clear, when it is pointed out that guiding and confining means similar to confiner 24, are provided on opposite sides of conveyor 15—16 in the shape of straight rods or rods, tubes or the like, as indicated in the case of one thereof at 30 in Fig. 1. Of course, in this connection, tank 8 and well 10 are provided with cut-out portions around shaft 18 to permit unimpeded progress of an egg from the right-hand end of chute 23 to the receptacle or the like 12.

What has thus just been described is the apparatus preferred to be used, while also constituting an embodiment of the invention, to facilitate a carrying out of the processing.

I claim:

1. In egg-processing apparatus, the combination with a tank for containing a body of egg-processing liquid, of means for transporting a line of eggs continuously in a moving column to maintain certain of the eggs at least partially submerged while advancing an egg near the rear end of the column toward such submergence and while simultaneously advancing an egg near the front end of the column away from such submergence.

2. In egg-processing apparatus, the combination of a spiral conveyor, having a cone-shaped portion, and a tank for processing liquid adapted to contain such liquid at a level such that a portion of the conveyor adjoining the cone-shaped portion thereof is adapted to be at least partially submerged in the liquid.

3. In egg-processing apparatus, the combination of a spiral conveyor, a tank for processing liquid adapted to contain such liquid at a level such that a portion of the conveyor is adapted to be at least partially submerged in the liquid, and guiding and confining means adjacent the conveyor for maintaining an egg always above the axis of rotation of the conveyor.

4. The apparatus as defined in claim 3, said guiding and confining means including a rotatable brush for scrubbing an egg during transport by the conveyor.

WILLIAM H. ROUSSEL.